(12) United States Patent
Bucheton et al.

(10) Patent No.: US 8,444,086 B2
(45) Date of Patent: May 21, 2013

(54) AIRCRAFT WHEEL-AND-BRAKE SET FITTED WITH A ROTARY DRIVE DEVICE

(75) Inventors: Daniel Bucheton, Le Chesnay (FR);
Florent Nierlich, Lagarenne-Colombes (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 350 days.

(21) Appl. No.: 12/975,739

(22) Filed: Dec. 22, 2010

(65) Prior Publication Data
US 2011/0156472 A1 Jun. 30, 2011

(30) Foreign Application Priority Data
Dec. 24, 2009 (FR) .................................. 09 59586

(51) Int. Cl.
*B64C 25/42* (2006.01)
(52) U.S. Cl.
USPC ........................ 244/111; 244/103 S; 244/51
(58) Field of Classification Search
USPC .... 244/111, 50, 103 S, 103 R, 51; 188/73.31, 188/71.1; 29/402.01, 402.08; 192/20, 18 R
See application file for complete search history.

(56) References Cited

U.S. PATENT DOCUMENTS

| | | | | |
|---|---|---|---|---|
| 3,236,338 A * | 2/1966 | Mayer | ............................ | 188/270 |
| 3,977,631 A * | 8/1976 | Jenny | ............................... | 244/50 |
| 4,591,313 A * | 5/1986 | Miyatake et al. | ............... | 416/155 |
| 6,450,448 B1 * | 9/2002 | Suzuki | ....................... | 244/104 FP |
| 7,445,178 B2 * | 11/2008 | McCoskey et al. | ................ | 244/50 |
| 8,109,463 B2 * | 2/2012 | Cox et al. | .......................... | 244/50 |
| 8,123,163 B2 * | 2/2012 | Mccoskey et al. | ............ | 244/110 A |
| 8,136,755 B2 * | 3/2012 | Hadley et al. | ....................... | 244/50 |
| 8,136,761 B2 * | 3/2012 | Kiyosawa | ................... | 244/103 R |
| 8,201,774 B2 * | 6/2012 | Gieras et al. | ....................... | 244/111 |
| 2007/0241230 A1 * | 10/2007 | Bucheton et al. | ........... | 244/104 R |
| 2007/0284478 A1 * | 12/2007 | Soderberg | ................... | 244/103 R |
| 2009/0114765 A1 * | 5/2009 | Cox et al. | .......................... | 244/50 |
| 2009/0120739 A1 * | 5/2009 | Corio | ............................ | 188/73.32 |
| 2010/0288873 A1 * | 11/2010 | Cox et al. | .......................... | 244/50 |
| 2012/0126053 A1 * | 5/2012 | Christensen et al. | ............. | 244/50 |

FOREIGN PATENT DOCUMENTS

DE 10 2008 006 295 A1 7/2009
EP 1 867 567 A1 12/2007

* cited by examiner

*Primary Examiner* — Christopher P Ellis
*Assistant Examiner* — Medhat Badawi
(74) *Attorney, Agent, or Firm* — Sughrue Mion, PLLC

(57) ABSTRACT

The invention provides an aircraft wheel-and-brake set, the wheel including a rim mounted to rotate on an axle of the aircraft about an axis of rotation, and the brake including a stack of disks extending into the rim in service, and a support carrying brake actuators facing the stack of disks in order to selectively press said disks together, wherein the support carries at least one rotary drive member for driving the wheel in rotation, which drive member is carried in such a manner that it extends outside said wheel.

4 Claims, 4 Drawing Sheets

AIRCRAFT WHEEL-AND-BRAKE SET FITTED WITH A ROTARY DRIVE DEVICE

The invention relates to motorizing the wheels of the main undercarriage of an aircraft.

TECHNOLOGICAL BACKGROUND OF THE INVENTION

In order to make it possible to economize fuel and to reduce the noise and pollution generated by the operation of jet engines on the ground, proposals have been made to move an aircraft while on an airfield without using its propulsion engines, by motorizing the wheels of the aircraft. In that respect, various proposals have been made. In particular, proposals have been made to motorize the wheels of the aircraft by means of a motor that is placed directly in the rim of the wheel. However, for wheels of a main undercarriage that are fitted with brakes, the space inside the rim is generally occupied entirely by the brake, in such a manner that that arrangement cannot be envisaged.

Proposals have been made to leave the torque tube of the brake free to rotate on the axle carrying the wheel and to drive it in rotation by means of an electric motor. In order to rotate the wheel, it is desirable to secure the wheel to the torque tube, by actuating the corresponding brake. However, during braking, the electric motor must hold the torque tube stationary by countering the braking torque generated by the disks, and must therefore be dimensioned accordingly. That arrangement complicates the brake a great deal.

OBJECT OF THE INVENTION

The invention provides a braked aircraft wheel fitted with a rotary drive device that does not require the undercarriage to be modified.

BRIEF DESCRIPTION OF THE INVENTION

With a view to achieving this object, the invention provides an aircraft wheel-and-brake set, the wheel including a rim mounted to rotate on an axle of the aircraft, and the brake including a stack of disks extending into the rim in service, and an actuator-carrier carrying brake actuators facing the stack of disks, and in which the actuator-carrier further carries at least one rotary drive member for driving the wheel in rotation, which drive member extends outside the rim.

Thus, the rotary drive member is carried by the actuator-carrier, and this requires no modification of the undercarriage itself, the drive member advantageously being suitable for extending in a region that is free from any interference, e.g. above the rocker arm of the undercarriage if the undercarriage is fitted with a rocker arm, or in front of or behind the sliding rod of the undercarriage, if the wheels are carried by the sliding rod. In these regions, the available space is much greater than inside the rim, so it is possible to provide a drive member of a certain volume.

In a preferred arrangement, the actuator-carrier carries a ring gear that is mounted to rotate about the support, the ring gear being constrained in rotation with the wheel, while the ring gear is being driven by the rotary drive member.

In this arrangement, the ring gear presents a diameter that is large enabling a considerable amount of speed reduction between the rotary drive member and the wheel.

Preferably, the ring gear comprises two members, one of which is constrained to rotate with the drive member and the other is constrained to rotate with the wheel, coupler means making it possible selectively to constrain both members of the gear in rotation with each other. Thus, it is possible to separate the rotary drive member from the wheel, so that said wheel can rotate freely, without being slowed down or even blocked by the rotary drive member.

BRIEF DESCRIPTION OF THE FIGURES

The invention can be better understood in light of the following description of the figures of the accompanying drawings, in which.

DETAILED DESCRIPTION OF THE FIGURES

Figure 1:
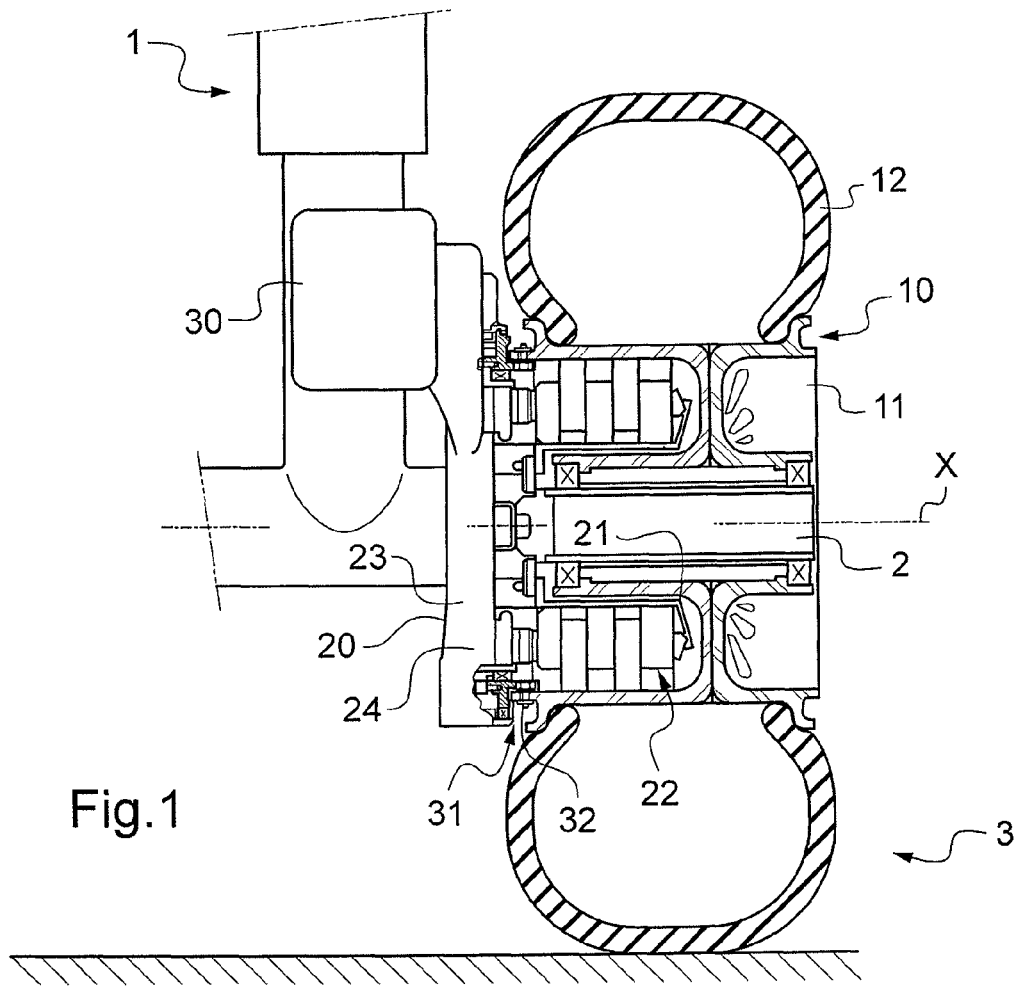
FIG. 1 is a front view partly in section of undercarriage carrying two wheel-and-brake sets in a first particular embodiment of the invention, with only one of the sets being shown, for more clarity.

With reference to FIG. 1, the invention is shown in application to an undercarriage 1 with its bottom portion carrying an axle 2 for receiving two wheel-and-brake sets 3 on either side of the undercarriage. Only one of these sets is shown in this figure.

Each set comprises:

- a wheel 10 comprising a rim 11 (here comprising two half-rims) that receives a tire 12, and that is mounted to rotate on the axle 2 by means of bearings, about an axis of rotation X; and
- a brake 20 comprising a torque tube 21 bolted to the undercarriage so as to be stationary in rotation, disks 22 extending between the torque tube 21 and the rim 11, with alternate disks being constrained to rotate with the rim 11 and with the torque tube 21, and an actuator-carrier 23 fastened to the torque tube 21 and carrying brake actuators 24, in this example hydraulic actuators, each comprising a piston mounted to slide in the cavities of the actuator-carrier 23. Naturally, this is not limiting, and the actuators may be of the electric type, incorporated in the structure of the actuator-carrier as in this example, or individually removable.

In the invention, the actuator-carrier 23 carries a rotary drive member, specifically in this example, an electric geared motor 30 that drives in rotation a ring gear 31 that is mounted about the actuator-carrier 23 in order to rotate on said actuator-carrier about the axis of rotation X of the wheel 10.

Figure 4:
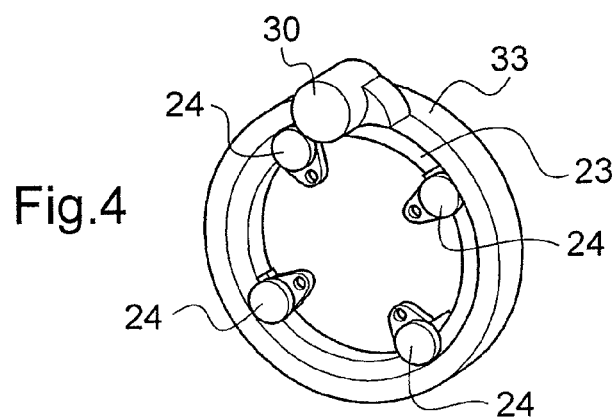
FIG. 4 is a perspective view of the actuator-carrier carrying the drive member.

FIG. 4 clearly shows the actuator-carrier 23 carrying the brake actuators 24 and the geared motor 30. The ring gear 31 is not visible in this figure because it is contained inside a casing 33 that extends around the actuator-carrier 23 in order to protect the ring gear 31. FIG. 1 shows that the actuator-carrier 23 is disposed angularly about the axis of rotation X of the wheel in such a manner that the geared motor lies in front of the sliding rod of the undercarriage. On the other wheel, the actuator-carrier is disposed angularly in such a manner that the corresponding geared motor does not interfere with the geared motor of the first wheel. Thus, the geared motors occupy spaces free from any interference, without interfering with each other, or with the structure of undercarriage.

Figure 2:
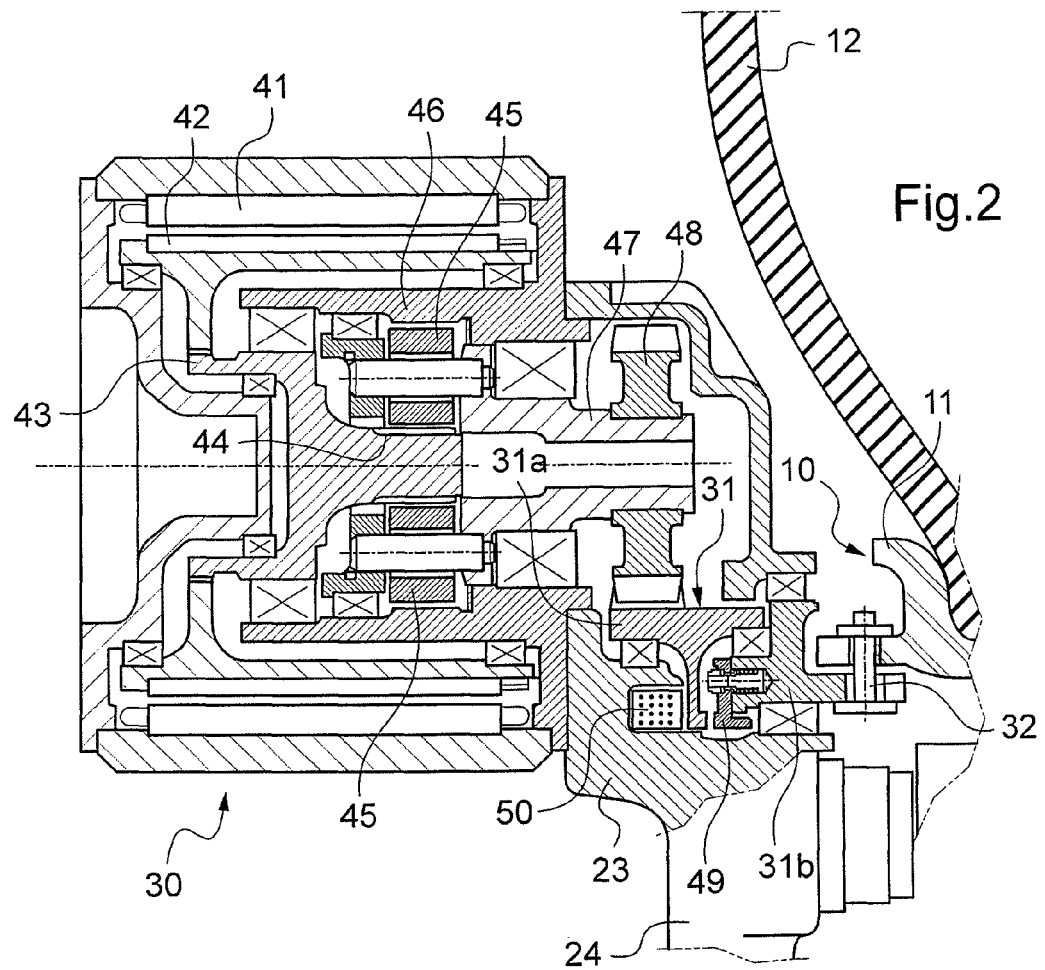
FIG. 2 is an enlarged section view of the rotary drive member in rotation provided in the FIG. 1 wheel-and-brake set.

More precisely, and with reference to FIG. 2, the geared motor 30 comprises firstly an annular electric motor with a stator 41 and a rotor 42 mounted to rotate about an axis of rotation X, in this example extending parallel to an axis of rotation of the corresponding wheel. The rotor 42 is coupled in rotation to an inlet shaft 43 that forms the sun gear 44 of an epicyclic speed reduction gear, having planet gears 45 that can be seen in the figures. Said planet gears co-operate with a stationary ring gear 46 and are carried by a planet carrier 47 having an outlet shaft that receives an outlet pinion 48 at its end.

The outlet pinion 48 co-operates with the ring gear 31 in order to rotate said gear and thus drive the wheel in rotation by means of coupling pins 32. In this example, the ring gear 31 is of a diameter that is large, being substantially equal to the diameter of the rim, in such a manner that a substantial speed reduction is obtained between the outlet pinion 48 and the ring gear 31, with this reduction being in addition to the reduction provided by the epicyclic gear of the geared motor 30.

Figure 3:
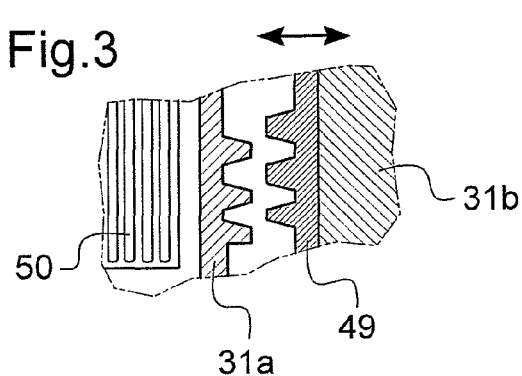
FIG. 3 is a fragmentary plan view of the coupler means between the two members of the ring gear.

In this example, it should be noted that the ring gear 31 is in fact made up of two half-gears 31a and 31b, both mounted to rotate about the same axis of rotation. The half-gear 31a is directly driven in rotation by the outlet pinion 48, while the half-gear 31b is coupled to the wheel 10 by coupling pins 32. The two half-gears are mounted to rotate on the actuator-carrier 23 independently from each other, but they may be selectively coupled together by means of a coupler member 49 having radial teeth and visible in FIG. 3. In this example, the coupler member 49 takes the form of a dog clutch mounted to move on the half-gear 31b in an axial direction in order to engage the corresponding radial teeth of the half-gear 31a, under the action of an annular electromagnet 50 extending in the actuator-carrier 23. Thus, it is possible on demand to couple together or to uncouple the two half-gears 31a, 31b, and, thus, the geared motor 30 and the wheel 10. FIG. 3 shows the possible movement of the dog clutch 49 under the action of the electromagnet 50, between the position shown in the figure that is an uncoupled position, and a coupled position in which the teeth of the dog clutch 49 engage the teeth of the half-gear 31a.

The geared motor 30 and the wheel 10 are coupled together when it is desirable to drive the wheel 10 by means of the geared motor 30, or when it is desirable to brake the wheel 10 by means of the geared motor 30 that then operates as a generator.

Driving the wheel by means of a geared motor disposed on the actuator-carrier therefore does not require any modification of the mechanical interfaces of the undercarriage. Naturally, it is necessary to run electric power cables for the geared motor down the undercarriage. The geared motor is thus naturally disposed in a free zone, so that it is not necessary to modify the undercarriage in order to make space for the geared motor. Apart from the brake actuator-carrier that is modified in order to receive the geared motor and the ring gear, the only modification consists in providing projections for receiving the coupling pins 32 on the rim of the wheel.

Figure 5:
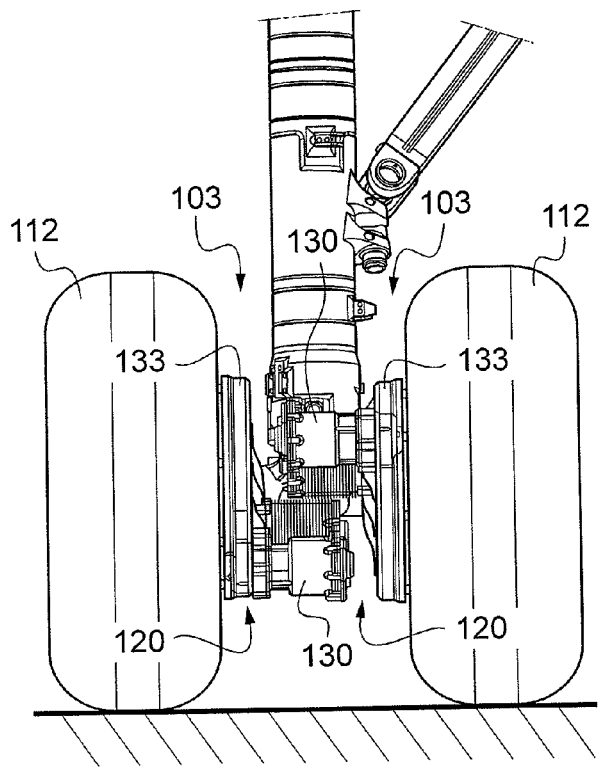
FIG. 5 is a front view of a main undercarriage fitted with two wheel-and-brake sets in a second particular embodiment of the invention.
Figure 6:
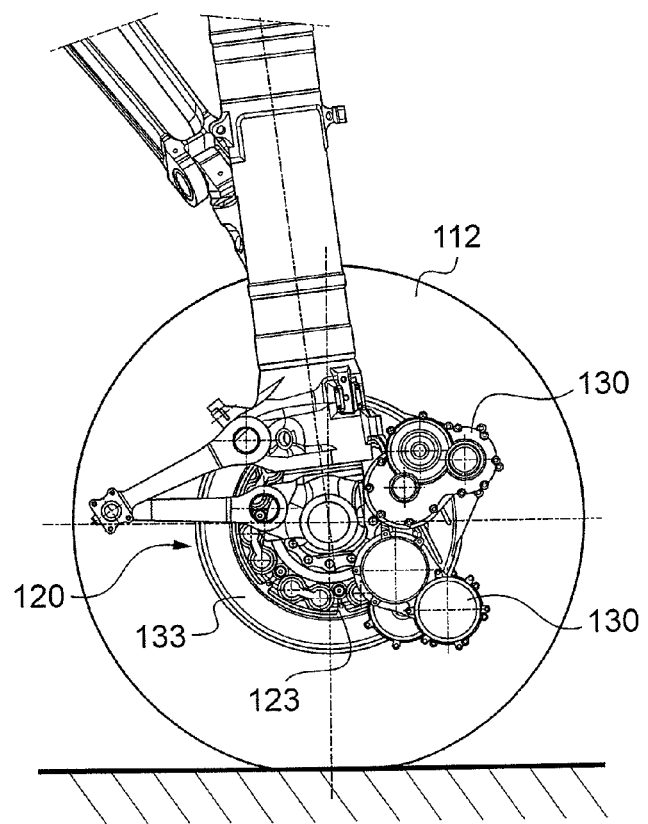
FIG. 6 is a partial side view of the FIG. 5 undercarriage, one of the wheels and the corresponding actuator-carrier being omitted.

FIGS. 5 and 6 show wheel-and-brake sets 103 in a particular embodiment of the invention, the sets being mounted on a main undercarriage that, in this example, includes two wheel-and-brake sets. In addition to the wheels 110, the figures show the actuator-carriers 120, each surrounded by a casing 133 protecting the ring gear (not shown), and the geared motors 130.

In FIG. 6, in which one of the wheels and the corresponding actuator-carrier are omitted in such a manner that only the corresponding geared motor remains, it can be seen that the two geared motors 130 are received comfortably one beneath the other in the space between the tires 112.

Figure 7:
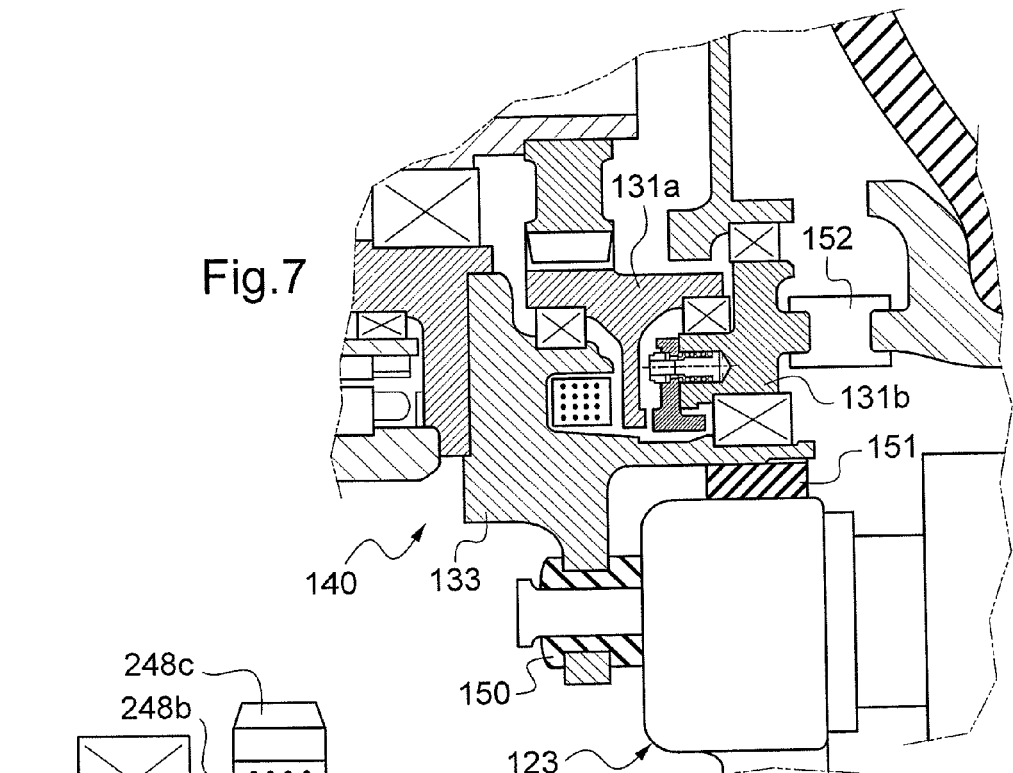
FIG. 7 is a diagrammatic local section view of one of the wheel-and-brake sets in FIGS. 5 and 6.

In a particular aspect of the invention, visible more particularly in FIG. 7, the set composed of the geared motor 130, of the ring gear 131, and of its casing 133 forms a single unit 140 that is placed on the actuator-carrier 123 by interposing damper means, in this example specifically silent-block bushings 150 and damper studs 151 having viscoelastic behavior, that are compatible with the temperatures that are capable of being generated by braking, and that perform several roles:

the damper means make it possible to absorb the deformation to which the actuator-carrier 123 is subjected under the braking stresses exerted by the brake actuators in such a manner that said deformation does not compromise guidance of the ring gear 131 in rotation;

the damper means filter the vibration induced by the overhanging arrangement of the geared motor 130 in order to avoid transmitting said vibration to the remainder of the wheel-and-brake set.

In yet another particular aspect of the invention, the ring gear 131 is no longer connected to the rim of the wheel in rigid manner, but is connected using resilient connection means 152, shown diagrammatically in FIG. 7, e.g. metal springs. These resilient connection means make it possible to absorb deformation or movement of the rim 111 relative to the ring gear 131.

Figure 8:
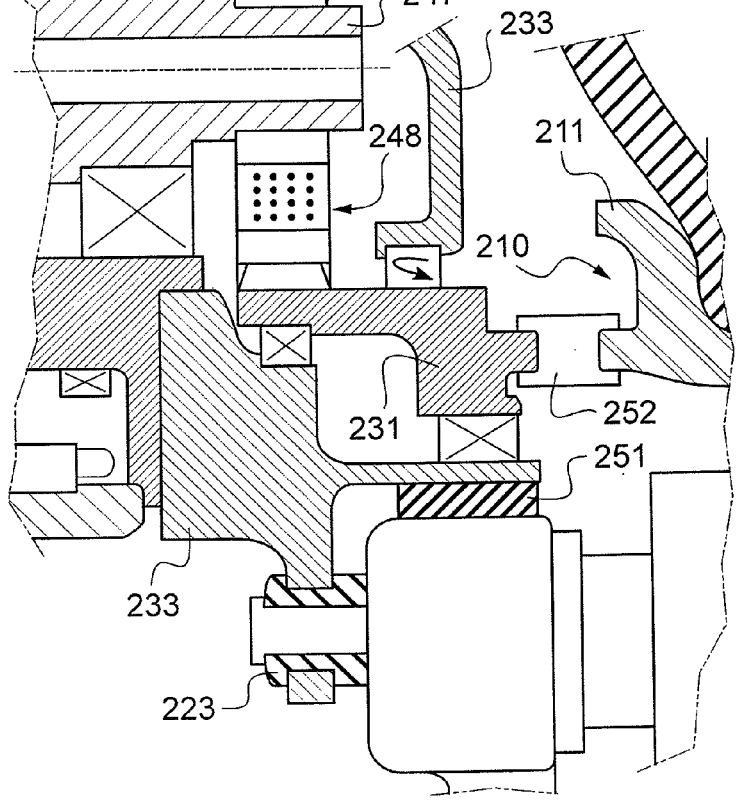
FIG. 8 is a diagrammatic local section view of a wheel-and-brake set in a variant embodiment of the invention.

In a variant embodiment shown in FIG. 8, the ring gear 231 is in a single element and is therefore permanently constrained to rotate with the rim 211 of the wheel 210, in this embodiment by means of resilient connection means 252.

In this embodiment, the outlet shaft of the planet carrier 247 is fitted with an outlet pinion 248 comprising a base 248a fastened to the outlet shaft, and a coupler agent 248b, for selectively coupling the base 248a to a coaxial toothed wheel 248c. The coupler agent 248b makes it possible on demand to couple together or to uncouple the motor of the geared motor from the ring gear 231 and, thus, from the wheel 210. This arrangement simplifies the design of the casing 233 and of the ring gear 231.

The invention is not limited to the above description, but on the contrary encompasses any variant within the ambit defined by the claims.

In particular, although in this example the rotary drive member is an electric geared motor, other rotary drive members could naturally be used, such as for example, a hydraulic motor. Although in this example the geared motor is fitted with an epicyclic speed reduction gear that is coaxial with the motor, use could naturally be made of other speed-reducing members, that need not necessarily be coaxial.

Although in this example the invention is described in application to an undercarriage having wheels that are carried by an axle that is mounted directly at the base of the sliding rod of said undercarriage, the wheel-and-brake set of the invention can also be mounted on an undercarriage having wheels that are carried by a rocker arm. It should therefore be ensured that the rotary drive member extends for example over and under the rocker arm, wherever space is available.

Although it is stated that the actuator-carrier receives a single drive member, naturally, the actuator-carrier may be fitted with a plurality of rotary drive members, each co-operating with the ring gear.

Although in this embodiment the ring gear for driving coupler means for selectively coupling the rotary drive member to the wheel (coupler member 49 and electromagnet 50, coupler agent 248*b*), such coupler means may be omitted if provision is made for the drive member to remain permanently coupled to the wheel without said coupling hindering its rotation or its braking. Finally, the ring gear could be omitted, by ensuring that the wheel is driven directly by the rotary drive member. To this end, it is advisable to fit the wheel with teeth or with drive portions in relief.

What is claimed is:

1. An aircraft wheel-and-brake set, the wheel including a rim mounted to rotate on an axle of the aircraft about an axis of rotation, and the brake including a stack of disks extending into the rim in service, and an actuator-carrier carrying brake actuators facing the stack of disks in order to selectively press said disks together, the actuator-carrier carrying at least one rotary drive member for driving the wheel in rotation in such a manner that the drive member extends outside the rim, wherein the actuator-carrier carries a ring gear that is mounted to rotate on the actuator-carrier about the axis of rotation of the wheel and that is driven in rotation by the rotary drive member, the ring gear being secured to the wheel in order to drive said wheel in rotation.

2. An aircraft wheel-and-brake set according to claim 1, wherein the ring gear comprises two half-gears, a first of which half-gears is directly driven in rotation by the rotary drive member, and a second half-gear is directly constrained to rotate with the wheel, coupler means being disposed in order to selectively connect the half-gears together in rotation.

3. An aircraft wheel-and-brake set according to claim 2, wherein the coupler means comprise a coupler agent disposed between an outlet shaft of the geared motor and a toothed wheel mounted to mesh with the ring gear.

4. An aircraft wheel-and-brake set according to claim 1, wherein the drive member and the ring gear are included in a single unit that is placed on the actuator-carrier with damper means being interposed thereon.

* * * * *